United States Patent [19]
Chen et al.

[11] Patent Number: 5,416,857
[45] Date of Patent: May 16, 1995

[54] APPARATUS AND METHOD FOR COMPRESSING DATA WHILE RETAINING IMAGE INTEGRITY

[75] Inventors: Wen-Tzer Chen; Shih-Gong Li, both of Austin, Tex.

[73] Assignee: International Business Machines Corporation, Armonk, N.Y.

[21] Appl. No.: 964,595

[22] Filed: Oct. 21, 1992

[51] Int. Cl.6 .............................................. G06K 9/36
[52] U.S. Cl. ................................... 382/237; 348/401; 348/409; 358/430
[58] Field of Search ............................. 382/56, 50, 54; 358/430, 432, 433; 348/400, 401, 409, 410; 375/27, 122; 364/715.02

[56] References Cited

U.S. PATENT DOCUMENTS

| | | | |
|---|---|---|---|
| 4,369,463 | 1/1983 | Anastassiou et al. | 358/135 |
| 4,486,785 | 12/1984 | Lasher et al. | 358/284 |
| 4,488,174 | 12/1984 | Mitchell et al. | 358/136 |
| 4,532,651 | 7/1985 | Pennebaker, Jr. et al. | 382/54 |
| 4,546,385 | 10/1985 | Anastassiou | 358/133 |
| 4,695,884 | 9/1987 | Anastassiou et al. | 358/163 |
| 4,725,885 | 2/1988 | Gonzales et al. | 358/135 |
| 4,853,970 | 8/1989 | Ott et al. | 382/54 |
| 5,081,450 | 1/1992 | Lucas et al. | 340/728 |
| 5,125,045 | 6/1992 | Murakami et al. | 382/50 |

OTHER PUBLICATIONS

IBM Technical Disclosure Bulletin, vol. 29, No. 1, Jun. 1986, "Logarithmic Range Differential Pulse Coded Modulation", pp. 375–378.

IBM Technical Disclosure Bulletin, vol. 22, No. 7, Dec., 1979, "Vertical Reference Coding for Digital Gray-Level Images", pp. 2980–2985.

*Primary Examiner*—Leo H. Boudreau
*Attorney, Agent, or Firm*—Casimer K. Salys

[57] ABSTRACT

Apparatus and method for compressing sequentially related data while fully preserving the informational content of the data. In a preferred form, digital format video image data individualized by pixel is compressed by defining a reference value for a first pixel position, encoding successive pixel values based on offsets from the reference value, and counting the pixels so encoded. Compression is obtained by having the bit count of the encoding be less than the original bit count associated with each pixel value. The reference value or encoding range is adjusted as necessary to retain the informational content of the original image data. The invention also find usage in a multimedia context, where the encoding is based upon a temporal relationship of single or multiple pixels. Full preservation of the original information content is retained throughout.

10 Claims, 8 Drawing Sheets

Information Preserving Data Compression

FIG. 1

COMPRESSION

```
START
  │
  ▼
Choose the number of bits to be used for encoding the gray level
difference. (The possible choice could be 0, 2, or 4 bits.) Records
the bit number at the 1st byte of the compressed image.
  │
  ▼
Scan the pixel from the upper left corner of the image. Use the
first pixel as a reference point and reset the counter.
  │
  ▼
Record the gray level of the reference pixel and reserve the next
byte for recording the number of pixels using the reference pixel.
  │
  ▼
Scan the next pixel  ◄─────────┐
  │                            │
  ▼                            │
End of image? ──Yes──►         │
  │                            │
  No                           │
  ▼                            │
Compute the gray level
difference (D) between the
scanned and the reference
pixels.
```

APPARATUS AND METHOD FOR COMPRESSING DATA WHILE RETAINING IMAGE INTEGRITY

BACKGROUND OF THE INVENTION

The present invention generally relates to data compression. More particularly, the invention is directed to apparatus and methods for compressing image type data while fully preserving the original information content.

Data compression, and particularly that which relates to image data, has been the subject of investigation for numerous years. In recent times, interest has been renewed and amplified as a consequence of the increasing use of graphics in computer workstations, and the associated storage of the voluminous data associated therewith. Another technology trend motivating the use of compression in data storage derives from the increasing use of high resolution and high color range video displays, with associated large increases both in pixel count and data per pixel.

Another aspect of data compression relates to preservation of information as may otherwise be degraded by imprecise compression and decompression apparatus and methods. For example, the increasing use of video imaging in medical fields, with the associated high resolution and high color range data, represents a source of information which must not only be amenable to storage, retrieval and transmission, but must when so managed fully preserve the original information content. Most existing apparatus and methods of compression fail in this regard, in that information content is exchanged for information volume.

Examples of apparatus and method for compressing image data appear in the prior art. U.S. Pat. No. 4,369,463 describes a quantizer which uses adjacent pixel information in an error feedback predictor to compress data. The article entitled Logarithmic Range Differential Pulse Coded Modulation, as appears in the IBM Technical Disclosure Bulletin, Vol. 29, No. 1, Jun. 1986, pp. 375–378, describes video image data compression in the manner defined by the title. The article entitled Vertical Reference Coding for Digital Gray-Level Images, as appears in the IBM Technical Disclosure Bulletin, Vol. 22, No. 7, December 1979, pp. 2980–2985, describes gray scale image data compression using vertical redundancy characteristics. U.S. Pat. No. 4,532,651 uses a gray scale filter to selectively and permanently remove the least significant bit of data, in reliance upon adjacent pixel information, to accomplish image compression. U.S. Pat. No. 4,546,385 compresses image data using bit planes and retaining gray scale data only at the edges of black/white regions as determined by a comparison of the bit planes. U.S. Pat. No. 4,725,885 compresses data using history data to adjust the selection of the reduced range of magnitudes assigned each pixel position. Lastly, recently issued U.S. Pat. No. 5,081,450 compresses video data by combining chrominance and luminance at individual adjusted larger levels of granularity.

The various approaches taken in such art accomplish degrees of compression at the expense of preserving the full content of the original information. As noted earlier, this lack of complete integrity between the data preceding compression and the data subsequent to decompression is unacceptable where, as in the case of medical imaging, the accuracy of the information content is crucial at particularized regions of the image.

SUMMARY OF THE INVENTION

The present invention overcomes the deficiencies in the prior art to the extent of preserving information content while providing a system and method for efficiently compressing and decompressing image data. As defined and preferably implemented the compression is adjustable in degree to conform to the character of the image. With respect to the latter point, the rate of compression is adjustable depending on the volatility of the image along the path subject to be compressed. For those areas of the image which remain relatively stable, tremendous rates of compression can be obtained. As the image dynamics increase, the rate of compression decreases.

In one form, the invention relates to an apparatus for compressing data which is composed of sequential blocks of related information and comprises a means for defining a reference magnitude from data in a first block, means for comparing two or more successive blocks having magnitudes extending over a first range with the reference magnitude, means for redefining the magnitudes of the data in the two or more successive blocks using a second range smaller than the first range, and means for generating compressed data using the combination of the reference magnitude, redefined blocks of data, and count number relating the redefined blocks of data to the reference magnitude. In another form, the invention relates to a method for accomplishing the operations defined by such apparatus. The invention also relates to apparatus and methods for decompressing the data using the apparatus and method defined earlier, as well as systems for storing and communicating through the practice of the compression defined herein.

These and other features of the invention will be better understood and appreciated upon considering the detailed description which follows.

DESCRIPTION OF THE PREFERRED EMBODIMENT

The present invention is preferably implemented in a computer workstation environment utilizing a RISC System/6000 workstation and AIX operating system, both of which are commercially available from IBM Corporation. As illustrated by the functional blocks in FIG. 1, the workstation can be configured as a standalone unit. In this context, the image is compressed, stored and retrieved from a non-volatile memory, such as a hard disk or optical disk, in the immediate proximity of the workstation. A more likely environment is a local area network (LAN) or wide area network (WAN) application, in which the original image frames and data compression logic reside on one workstation and the decompression logic and storage of image frames is accomplished on a different workstation at a remote location and connected to the LAN or WAN through a communication system. In either practice, the fundamental concepts of the invention remain unchanged.

The invention will be described in the context of image compression, in that such applications are most likely to benefit significantly from this form of compression. Furthermore, image data compression is of particular contemporary interest given the extensive data needed to digitally represent visual images. The underlying concepts of the invention are, however, broadly applicable to any application in which blocks of data are sequentially related and as such amenable to grouping.

The invention finds its origin in the appreciation of the fact that the changes between pixels in close proximity on the scan lines of raster video displays exhibit dynamic variations smaller than the full range assigned each pixel. This allows the pixels to be ordered into groups which exhibit relatively small variations from a dynamic norm. The changes in such grouped regions of pixels are quantitized with fewer bits of data, and correspondingly compress the effective data needed to define that group. Though various of the prior art implementations are able to compress image data exhibiting such groupings of collectively fixed image values, the practices do not fully preserve the original image information content. This failure is particularly undesirable in fields such as medical imaging, where huge amounts of image data exists, are subject to storage and transmission, yet must remain intact as to the informational content. This is true whether the images are gray scale, such as the commonly seen x-ray, or high definition multicolor CAT scan type images.

For purposes of explaining an implementation of the invention, the image subject to compression and decompression is assumed to be a raster scan gray scale image composed of 8 bits per pixel of image information. It is clearly apparent that even for such black and white image, a high resolution representation involves greater than one million pixels and therefore at least 8 megabytes of storage in uncompressed format. The objective is to store some of the pixel information in 0, 2 or 4 bit formats while preserving the full extent of the image information.

According to the invention, adjacent bits which do not change dramatically are grouped and encoded with fewer bits than the gray scale defined for the complete image. For purposes of the ensuing explanation, the lower granularity bit count is identified as "b". A counter is used to accumulate the number of pixels that are encodable with "b" level granularity referenced to a norm pixel. In the case of a conventional raster scan image, the compression preferably begins in the upper left corner of the image. The gray scale level of the first pixel is selected as the first reference value. It is recorded as the first byte of the compressed image. Following this reference pixel value, an 8 bit byte is reserved to record the number of pixels which are encoded using the reference pixel as the norm or zero level. Each pixel in the image is considered in succession. If the gray level of the next pixel is in the range of $R+2^{(b-1)}-1$ and $R-2^{(b-1)}+1$, where R is the gray level of the reference pixel, the count is increased by 1 and the difference attributed to such pixel is encoded in b bits. The procedure continues until a successive pixel falls beyond the specified range from the reference pixel encodable by b bits, or when the count exceeds the 8 bit limit of 255. The count is then recorded in association with that grouping and a new reference pixel is selected. The new reference pixel thereafter serves as the reference for encoding subsequent pixels using b bits.

Note that the value b is not fixed and as a consequence adjustable in the course of the scan where the dynamics of the information may require a change in the b level to improve the effective amount of the compression.

In the context of the 8 bit gray scale image the values of b can either be 0, 2 or 4, depending on the characteristics of the image. For example, if the image or part thereof contains very little information, that is, most of the pixels are at a fixed or background level, a 0 encoding is very efficient in terms of compression. On the other hand, image frames or parts thereof exhibiting significant dynamic would use 4 bit per pixel encoding, but at the expense of a lower compression ratio. The simplest implementation involves the selection of a single encoding value b based upon the overall characteristics of one or more images subject to compression.

Figure 1:
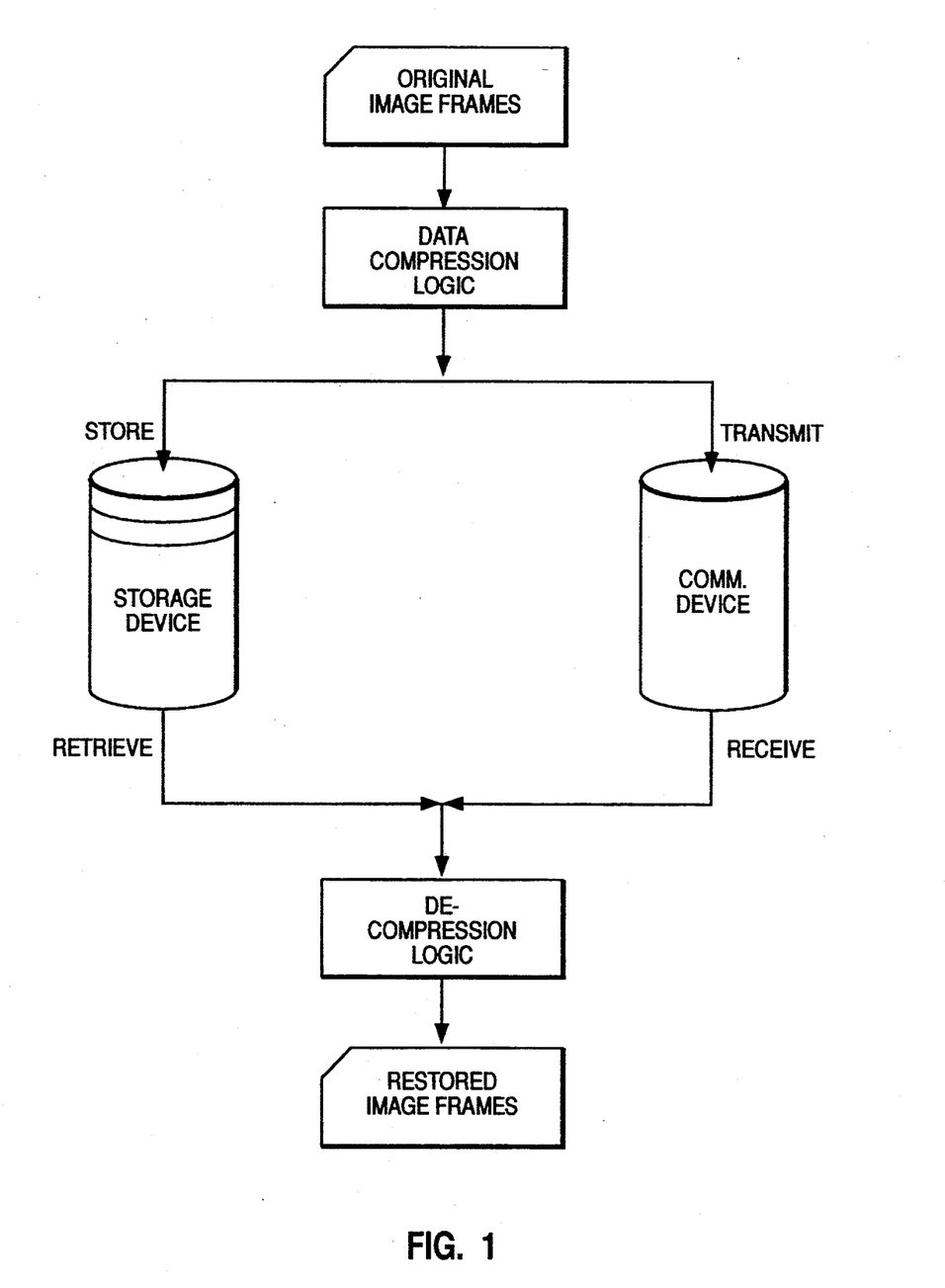
FIG. 1 is a schematic depicting an image management system including the compression, storage, communication and decompression of image data.
Figure 2A:
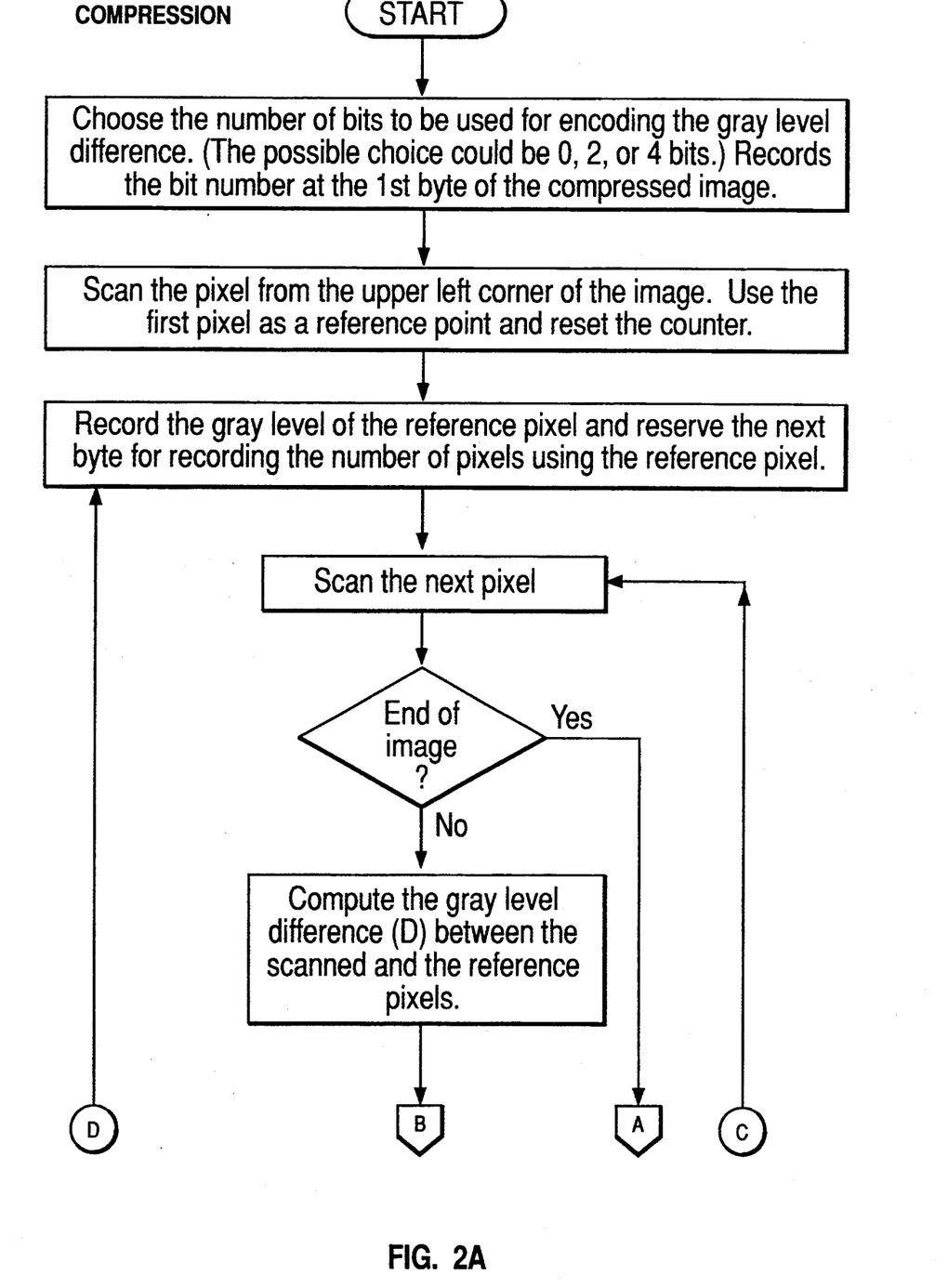
FIGS. 2a and 2b schematically depict by flow diagram of the present method of compression.
Figure 2B:
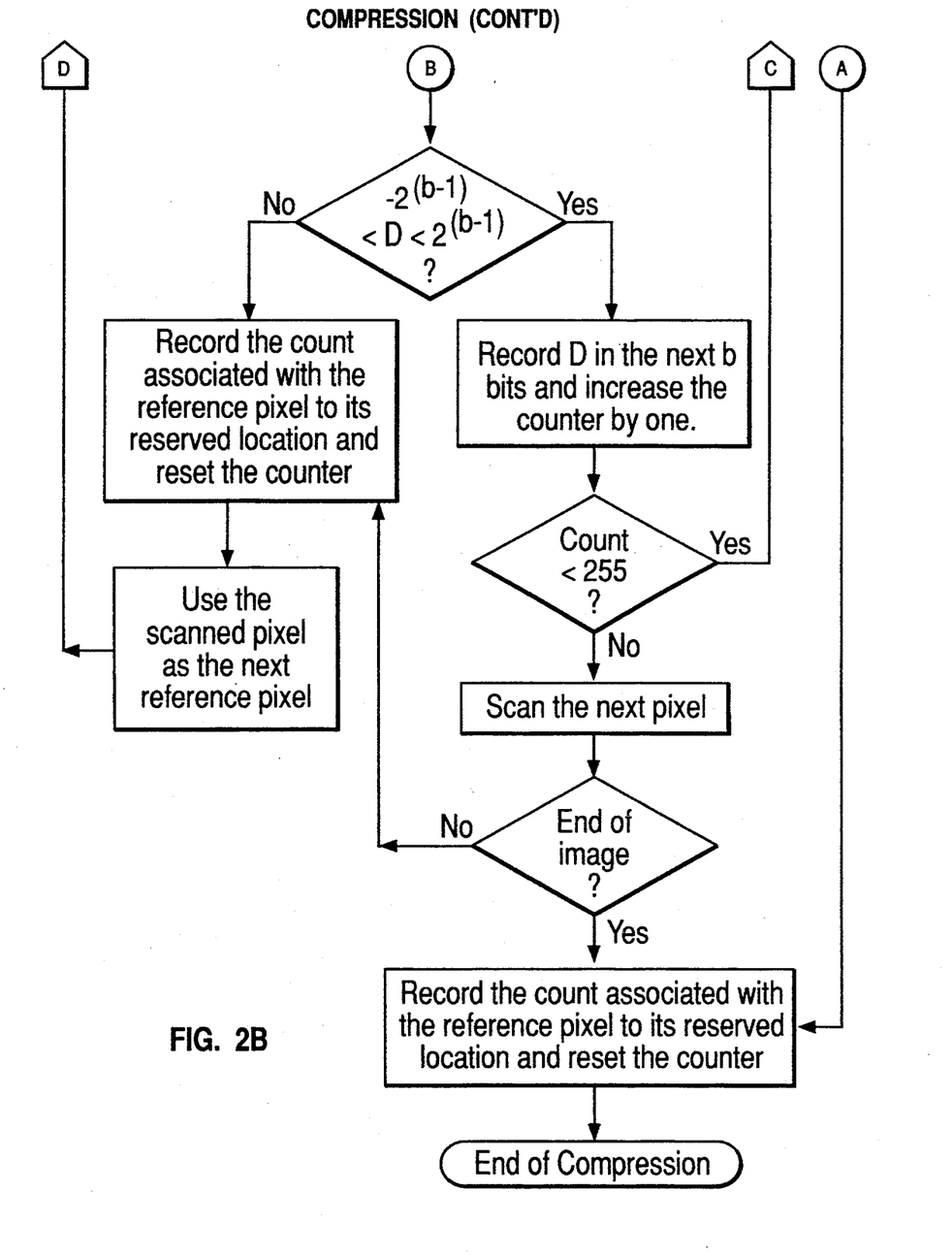

FIGS. 2a and 2b depict by flow diagram the steps and decisions characterizing the compression of a gray scale image originally defined by 8 bits per pixel information as typified by the earlier described medical imaging application. As shown in FIG. 1, once compressed the data representing such image can be stored for subsequent retrieval, or transmitted over some communication device for remote usage.

Figure 3:
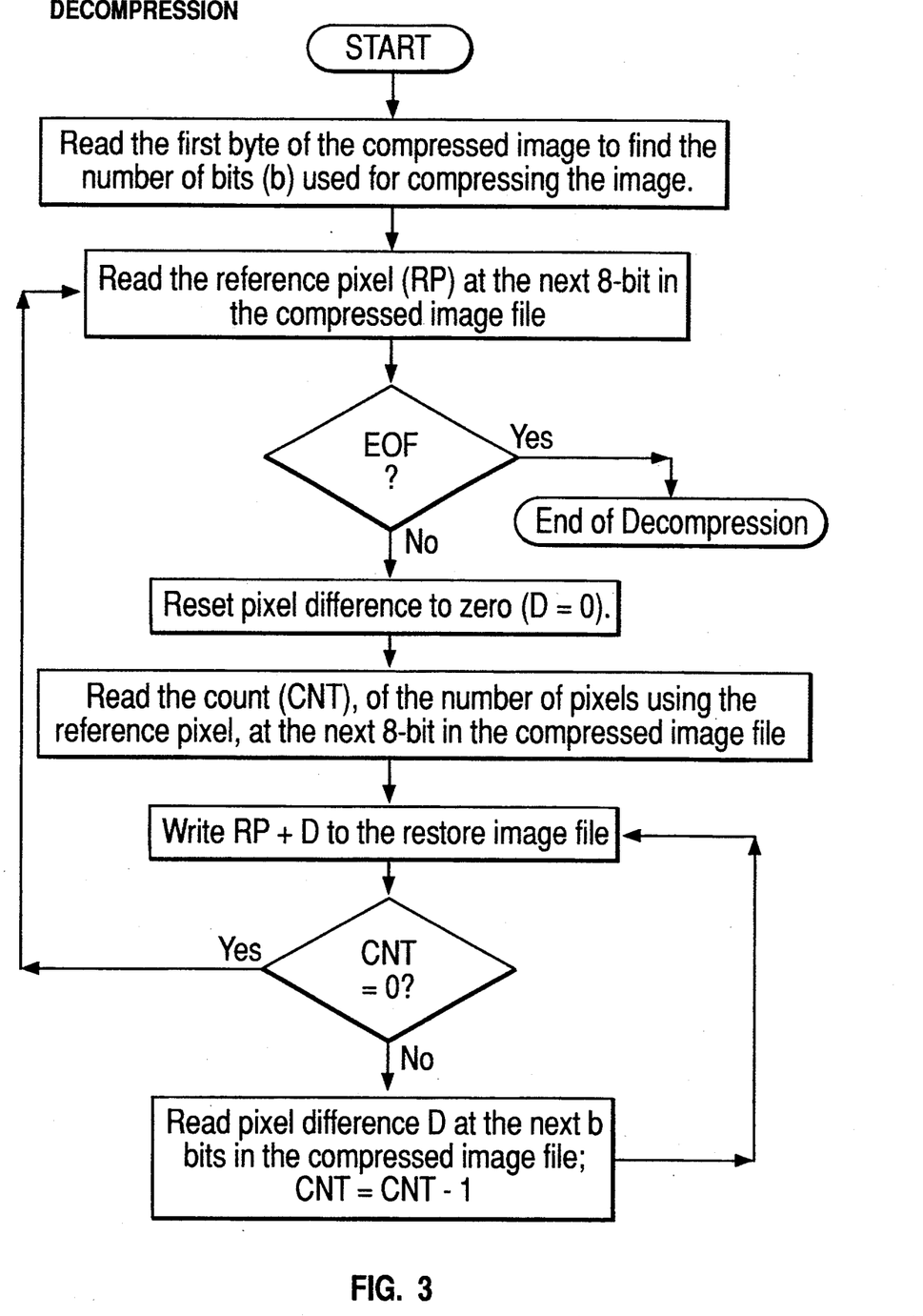
FIG. 3 schematically depicts by flow diagram the present method of decompression.

Decompression is performed in a complimentary manner and with complimentary apparatus to the compression described earlier. The operations and decisions are set forth by the flow diagram in FIG. 3. Again, the reference pixel defines the reference level, and the count defines the number of succeeding encoded pixels referenced thereto. Thereby, the image is completely and accurately regenerated.

Figure 4:
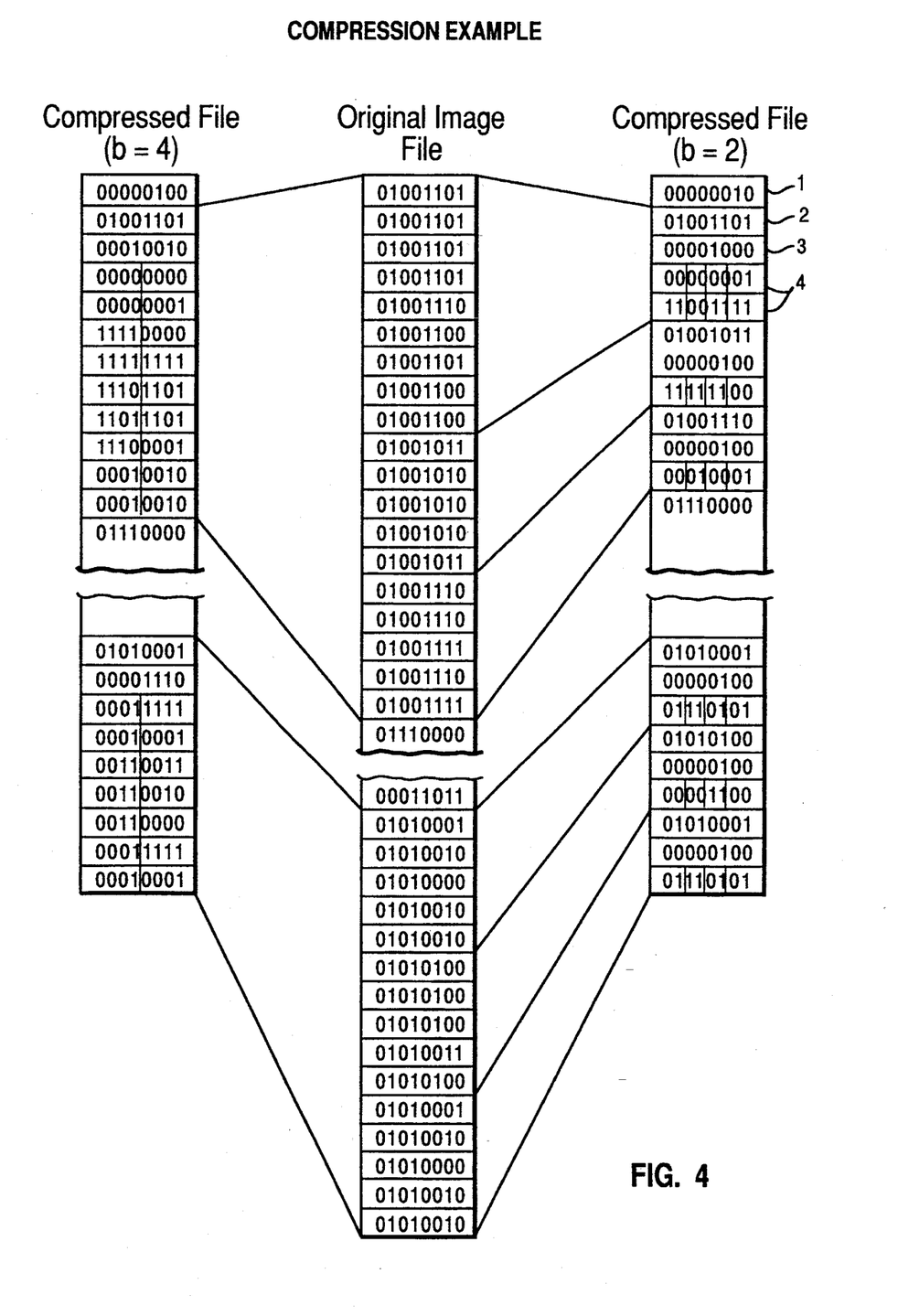
FIG. 4 schematically depicts by image related data streams different practices of the present compression.

A specific example of encoding an image file appears in FIG. 4. Note that the original image file, as illustrated by the succession of data bytes in the center of the figure, is compressed into a file at the left using an encoding of b=4, and an encoded with b=2 on the right. In the example of the compressed file using two bits per pixel position (b=2), the first byte, identified by reference numeral 1 represents the value of b. The second byte, identified by numeral 2 in the drawing, represents the reference value. The third byte 3 represents the count. The fourth and fifth bytes, identified by reference numeral 4, represent encoded pixel information for the eight pixels following the reference pixel as defined by differences from the reference value by pixel. Byte 1 need only be transmitted once for any frame in which the value of b remains constant. On the other hand, the group of bytes 2, 3 and 4 are transmitted each time the value of a pixel falls outside the range defined by the combination of b with the reference value. Compare the effects of encoding with b=4 as appears at the left of FIG. 4.

Figure 5:
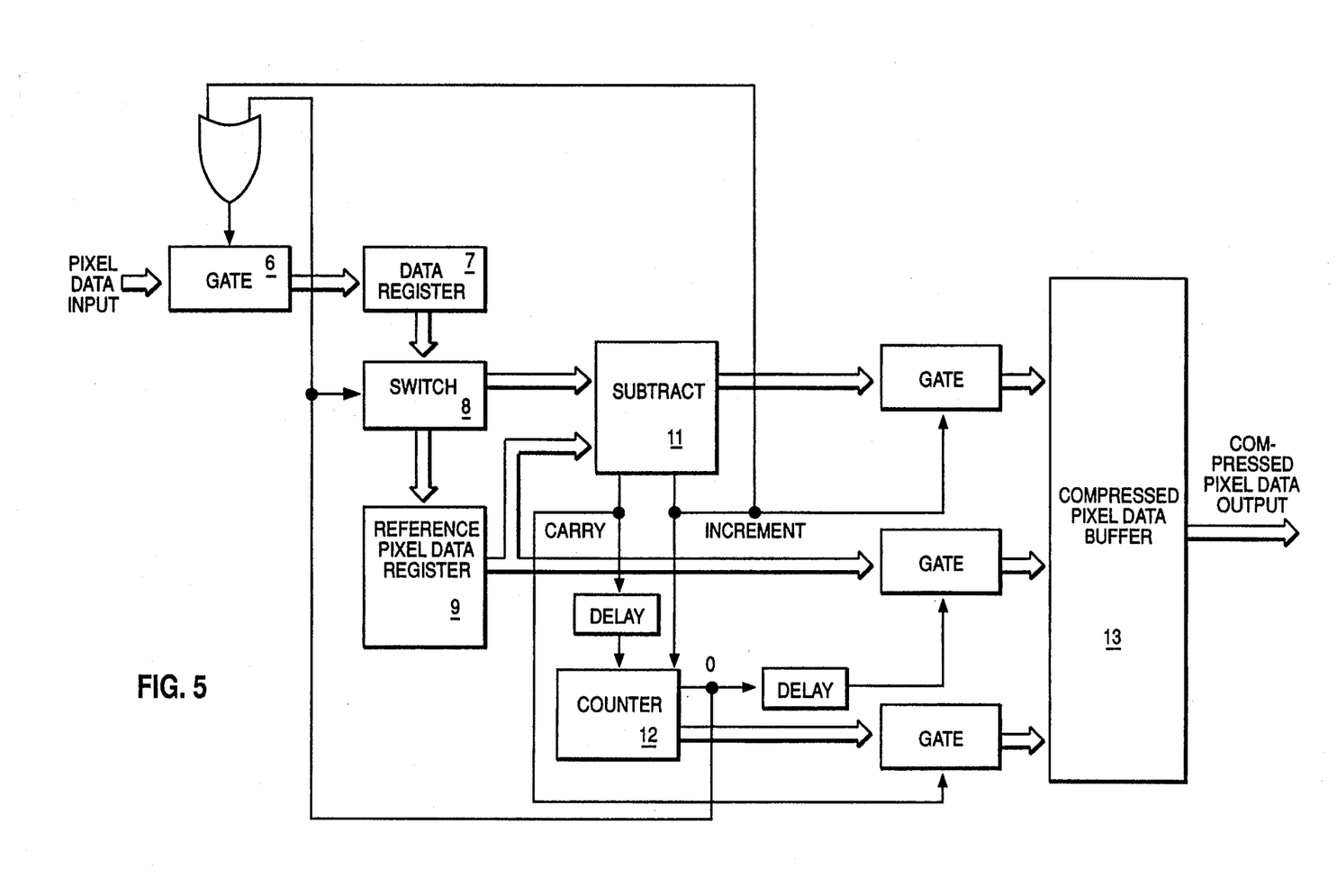
FIG. 5 schematically depicts by functional block diagram an embodiment of the compression apparatus.

FIG. 5 illustrates an apparatus for performing the compression defined by the invention. As noted earlier, the apparatus can be integrated into a workstation or can be a standalone device. Individual pixel data is input through gate 6, is stored in data register 7, and is selectively switched by 8 depending on whether it represents the reference pixel data, in which event it is entered into register 9, or encoded data to be conveyed to subtraction logic in block 11. Counter 12 is incremented each time pixel information can be encoded based upon the reference and encoding level. The reference value, count, and individualized encoded pixel data are gated into buffer 13. The apparatus in FIG. 5 illustrates compression using a fixed level of encoding. Variation of the apparatus to handle different encoding levels is fairly trivial.

Figure 6:
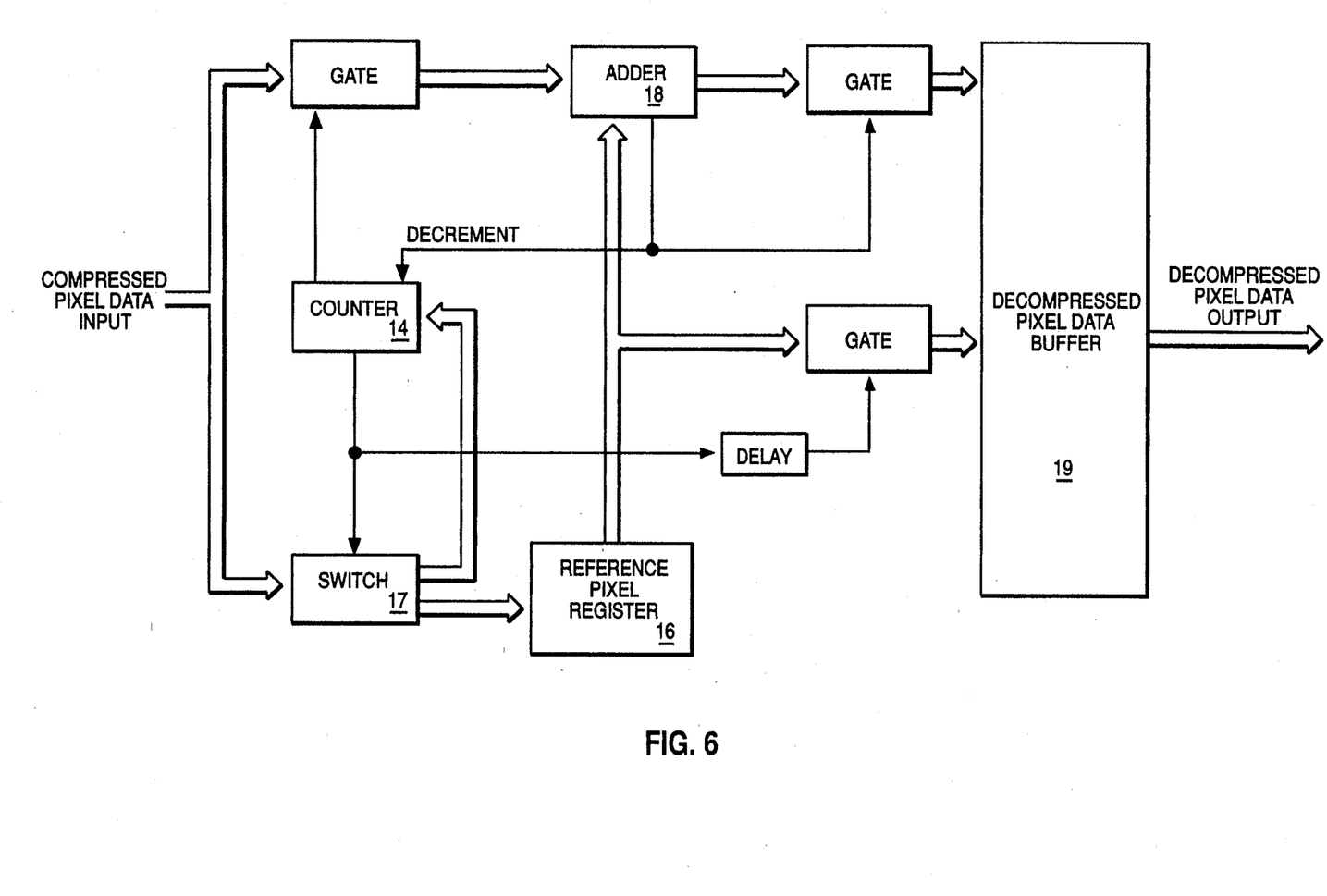
FIG. 6 schematically depicts by functional block diagram apparatus to perform decompression.

FIG. 6 depicts the complimenting decompression apparatus. As shown, the apparatus includes counter 14, for tracking the number of pixels subject to that encoding level and reference value, a reference pixel value register 16, switch 17 for conveying the reference byte, adder 18 for summing the encoded pixel data with the reference value, and buffer 19 for selectively arranging the decompressed pixel data. Again, the encoding level in the illustrated apparatus is fixed at initialization of the frame or the like. The ordered arrangement of the data exemplified in FIG. 4 illustrates that variation of the encoding level b is readily attainable in a decompression system.

Figure 7:
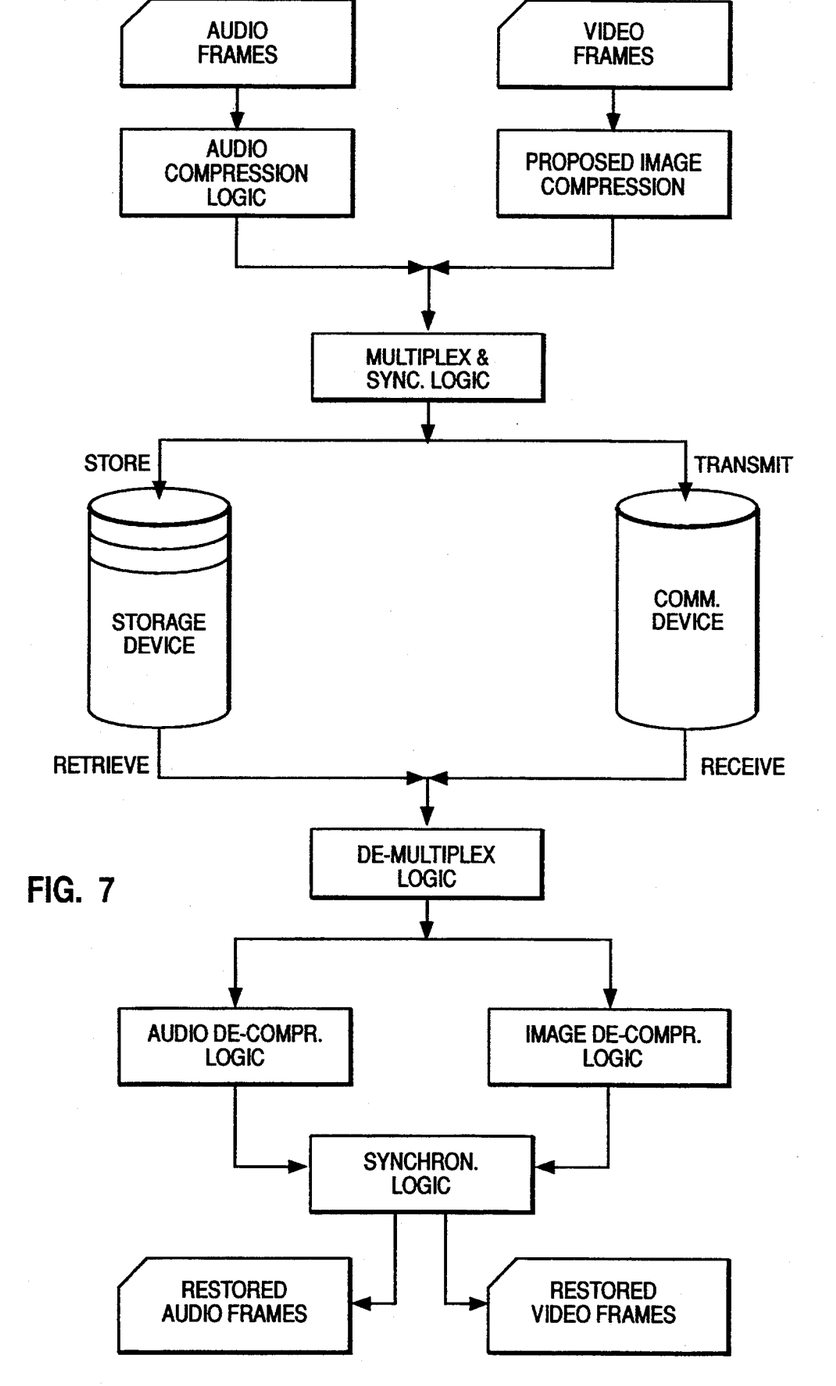
FIG. 7 depicts by schematic block diagram a multimedia practice of the compression defined by the present invention.

FIG. 7 illustrates an application of the present compression invention to multimedia information. Each video frame can be treated as a still image for purposes of compression. Likewise for the related audio information. Once compressed, the audio and video information is subject to storage or communication for subsequent decompression and presentation. A somewhat more efficient video compression can be obtained by recognizing that adjacent pixel information can be relatively static not only in the two dimensional spatial relationship of a single video frame, but also in a temporal relationship of corresponding pixel positions in successive video frames. In such context, a video frame can be defined as being composed of multiple timed distributed images, and is comparable as such for purposes of compression. The comparison can be based on a single pixel position over multiple time increments or a grouping of pixel positions over such successions of time. Compression as defined by the present invention is applicable in either context.

Compression of sequentially related data, as defined by the present invention, and in particular video images, is efficient both in process complexity and the apparatus associated with a practice thereof. Foremost, and in distinction from the prior art, the invention compresses image type information while fully preserving the original information content.

Though the invention has been described and illustrated by way specific embodiment, the methods and apparatus encompassed by the invention should be interpreted consistent with the breadth of the claims set forth hereinafter.

We claim:

1. Computing apparatus for compressing data of sequentially related information, comprising,
    means for defining a reference value from data in a first group;
    means for comparing the data in two or more successive groups, having values extending over a first range, with the reference value;
    means for redefining the values of the data in the two or more successive groups using a second range smaller than the first range, responsive to the means for comparing data;
    means for generating compressed data using the combination of the reference value, redefined groups of data, and a count number relating the redefined groups of data to the reference value; and
    means for storing generated data.

2. The apparatus recited in claim 1, further comprising:
    means for changing the reference value responsive to a detection, by the means for redefining, of a preference for a third range different than the second range.

3. The apparatus recited in claim 1, further comprising:
    means for changing the second range responsive to a detection, by the means for redefining, of a preference for a third range different than the second range.

4. Compiling apparatus for decompressing data representing sequentially related information into groups, comprising:
    means for receiving compressed data having the combination of a reference value, encoded data for groups, and a count number relating the encoded data to the reference value;
    means for generating decompressed groups of data by relating encoded data to the reference value; and
    means for reusing the reference value to generate decompressed groups of data in proportion to the count number.

5. The apparatus recited in claim 4, wherein the means for generating decompressed groups of data adds by group the encoded data to the reference value.

6. A computing system for communicating data which is composed of sequential blocks in compressed form, comprising:
    means for compressing data which is a first succession of data blocks using a reference value, offset data, and count data relating to the number of times the reference value applies to the offset data;
    means for transmitting the data in the form created by the means for compressing data;
    means for receiving the data in the form created by the means for compressing data; and
    means for decompressing the data received into the first succession of data blocks.

7. The system recited in claim 6, wherein the offset data used for the first succession of data blocks is equal to or larger in incremental values, but smaller in range of magnitude, than the data in each respective data block.

8. A computing apparatus for compressing data representing a raster scan image generated as a succession of pixel related data bytes, comprising:
    means for defining a reference magnitude from the data representing a first pixel;
    means for comparing the data for successive pixels, having magnitudes extending over a first range, to the reference magnitude;
    means for generating offset magnitudes for successive pixels using a second range of magnitude smaller than the first range, responsive to the means for comparing data;
    means for generating compressed data for a successive group of pixels using the combination of the reference magnitude, offset magnitudes, and a count number relating the group of pixels to the reference magnitude; and
    means for storing the generated data.

9. A computing system for storing data which is composed of sequential blocks in compressed form, comprising:

means for compressing data which is a first succession of data blocks using a reference value, offset data, and count data relating to the number of times the reference value applies to the offset data;

means for storing the data in the form created by the means for compressing data;

means for retrieving the data in the form created by the means for compressing data; and means for decompressing the data retrieved into the first succession of data blocks.

10. The system recited in Claim 9, wherein the offset data used for the first succession of data blocks is equal to or larger in incremental values, but smaller in range of magnitude, than the data in each respective data block.

* * * * *